May 23, 1939.  J. E. WINTERS  2,159,306

STUFFING BOX

Filed Feb. 18, 1938

J. E. Winters INVENTOR.

BY C. Snowles

ATTORNEYS.

Patented May 23, 1939

2,159,306

UNITED STATES PATENT OFFICE 2,159,306

STUFFING BOX

Jacob Everett Winters, Huntington Beach, Calif., assignor of thirty per cent to M. R. Williams, Los Angeles, Calif., and thirty per cent to C. E. Burkhard, Huntington Beach, Calif.

Application February 18, 1938, Serial No. 191,293

1 Claim. (Cl. 286—15)

This invention relates to certain new and useful improvements in stuffing boxes and while it is designed primarily for use in connection with the polished rods of well equipment, it can be employed wherever it is desired to maintain a tight packing capable of moving along lines extending transversely of the reciprocating element mounted therein.

Polish rods of oil wells and the like, during their reciprocation, tend to shift out of their normal paths of movement and, as a result, it has been difficult to maintain a tight packing without interfering with the operation of the rod.

An object of the present invention is to provide a stuffing box which can move with the reciprocating polish rod or the like if shifted transversely out of normal position and still maintain a tight seal as the rod reciprocates.

A further object is to provide a structure of this character which is simple in construction, easy to install, and will not readily get out of order.

With the foregoing and other objects in view, which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1:
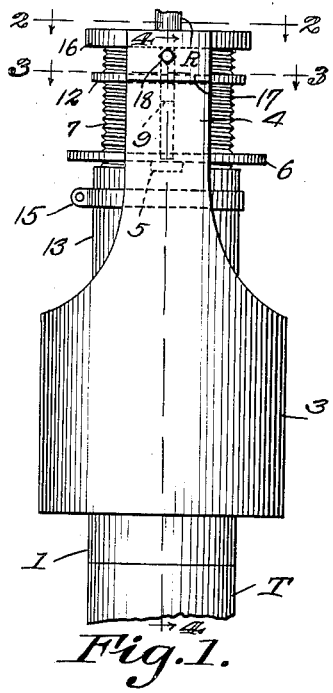
Figure 1 is a side elevation of the stuffing box constituting the present invention.
Figure 2:
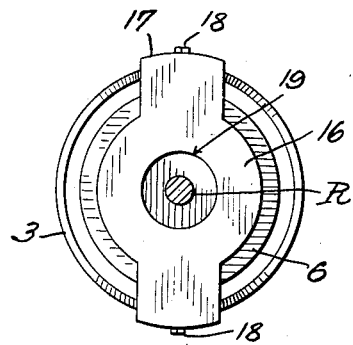
Figure 2 is a top plan view thereof, the polish rod being shown in section on the line 2—2, Figure 1.
Figure 3:
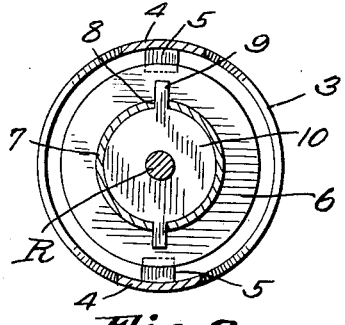
Figure 3 is a section on line 3—3, Figure 1.
Figure 4:
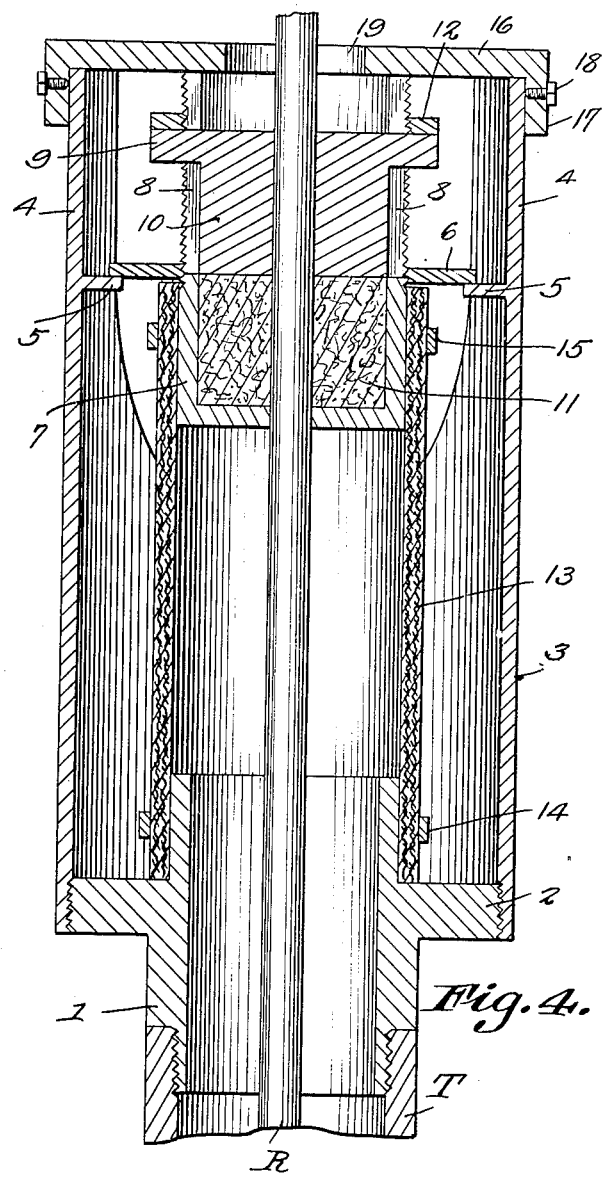
Figure 4 is an enlarged section on line 4—4, Figure 1.

Referring to the figures by characters of reference 1 designates a bushing having an annular flange 2 between its ends and adapted to engage, at its lower end, with the well tubing T. Flange 2 preferably is screw-threaded for engagement by the threaded lower end of a tubular housing 3 having opposed upper portions cut away so as to define opposed arms 4 carrying opposed inwardly extended lugs 5. These lugs extend under and support a retaining ring 6 screwed onto a packing gland 7 having longitudinal slots 8 through which project arms 9 extending from the compressing member 10 of the gland. Suitable packing material, indicated at 11, is contained in the gland and is adapted to be compressed by member 10 when forced thereagainst by the adjustment of a nut 12 which engages the threaded packing gland as shown and is adapted to thrust against the arm 9.

A flexible tube 13 which can be of a strong rubber hose or the like is held to the upper end of the bushing 1 by a clamp 14 and another clamp, 15, binds the other end of this tubular connection about the lower portion of the packing gland 7.

A top plate 16 bears upon the upper ends of the arms 4 and has downturned ears 17 for the reception of set screws 18 which are adapted to engage the arms, as shown, thereby fastening the top plate securely to housing 3. This top plate has an opening 19 through which the polish rod R extends. This polish rod also is adapted to work within and extends through the packing gland 7. The opening 19 is of much greater diameter than the rod so that said rod will not be limited in its transverse movement while reciprocating.

As the polish rod is mounted in a packing gland capable of shifting transversely in any direction under the action of the reciprocating rod R, this being due to the flexible connection 13 and the slidably supported ring 6, a tight joint can be maintained about the polish rod without placing the packing gland under excessive pressure such as might interfere with proper operation of the rod.

By providing the stuffing box with an outside housing, it is protected from the weight of the rods in case of a break in the hook-up thereabove or while the workmen are engaged in necessary routine of operation.

Importance is attached to the fact that the packing nut is extremely small and simple in construction as compared with similar devices commonly used, thereby effecting a considerable saving of space.

What is claimed is:

A stuffing box including a bushing for attachment to a well tubing or the like, an annular flange thereon, a housing secured to and extending upwardly from the flange, a top plate detachably secured to the housing, a packing gland means for supporting the gland within and from the housing, said gland and the upper end of the bushing being spaced from the housing, and a flexible tube mounted at its ends on the upper end of the bushing and the lower portion of the gland respectively and spaced throughout its length from the housing, said tube being positioned to surround a polish rod or the like mounted for reciprocation within the gland and bushing, the gland and tube being positioned between the bushing and the top plate, said top plate constituting means for limiting the movement of the gland in one direction with the polish rod and said supporting means between the housing and gland constituting means for limiting the movement of the gland in the opposite direction with the polish rod.

JACOB EVERETT WINTERS.